(12) United States Patent
Tokue

(10) Patent No.: US 8,384,463 B2
(45) Date of Patent: Feb. 26, 2013

(54) CLOCK SUPPLY CIRCUIT AND CONTROL METHOD THEREOF

(75) Inventor: Tatsuya Tokue, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 70 days.

(21) Appl. No.: 13/074,889

(22) Filed: Mar. 29, 2011

(65) Prior Publication Data

US 2011/0248758 A1    Oct. 13, 2011

(30) Foreign Application Priority Data

Apr. 7, 2010   (JP) ................................ 2010-088413

(51) Int. Cl.
*G06F 1/04*   (2006.01)
*H03K 3/00*   (2006.01)

(52) U.S. Cl. ..................... 327/291; 327/292; 327/295

(58) Field of Classification Search .................. 327/291, 327/292, 295
See application file for complete search history.

(56) References Cited

U.S. PATENT DOCUMENTS

| 6,972,609 B2 * | 12/2005 | Shimamoto ................... 327/295 |
| 7,093,152 B2 | 8/2006 | Shikata et al. |
| 7,640,446 B1 * | 12/2009 | Donovan ...................... 713/322 |

FOREIGN PATENT DOCUMENTS

JP   2003-058271 A   2/2003

* cited by examiner

*Primary Examiner* — John Poos
(74) *Attorney, Agent, or Firm* — Sughrue Mion, PLLC

(57) ABSTRACT

A clock supply circuit includes a clock generating portion configured to generate a clock signal and to change a frequency of the clock signal from a first frequency to a second frequency being higher than the first frequency; and a intermittent clock generating portion configured to receive the clock signal and to mask a clock pulse of the clock signal at a predetermined rate for a predetermined period when the frequency of the clock signal is changed to the second frequency.

4 Claims, 10 Drawing Sheets

CONDITION REGISTER

| IDENTIFICATION CODE | NAME | MONITOR FLAG |
|---|---|---|
| 0 | CPU | 0 |
| 1 | DSP | 0 |
| 2 | DMAC | 0 |
| 3 | ... | 0 |
| ... | ... | 1 |
| ... | ... | 1 |
| ... | ... | ... |

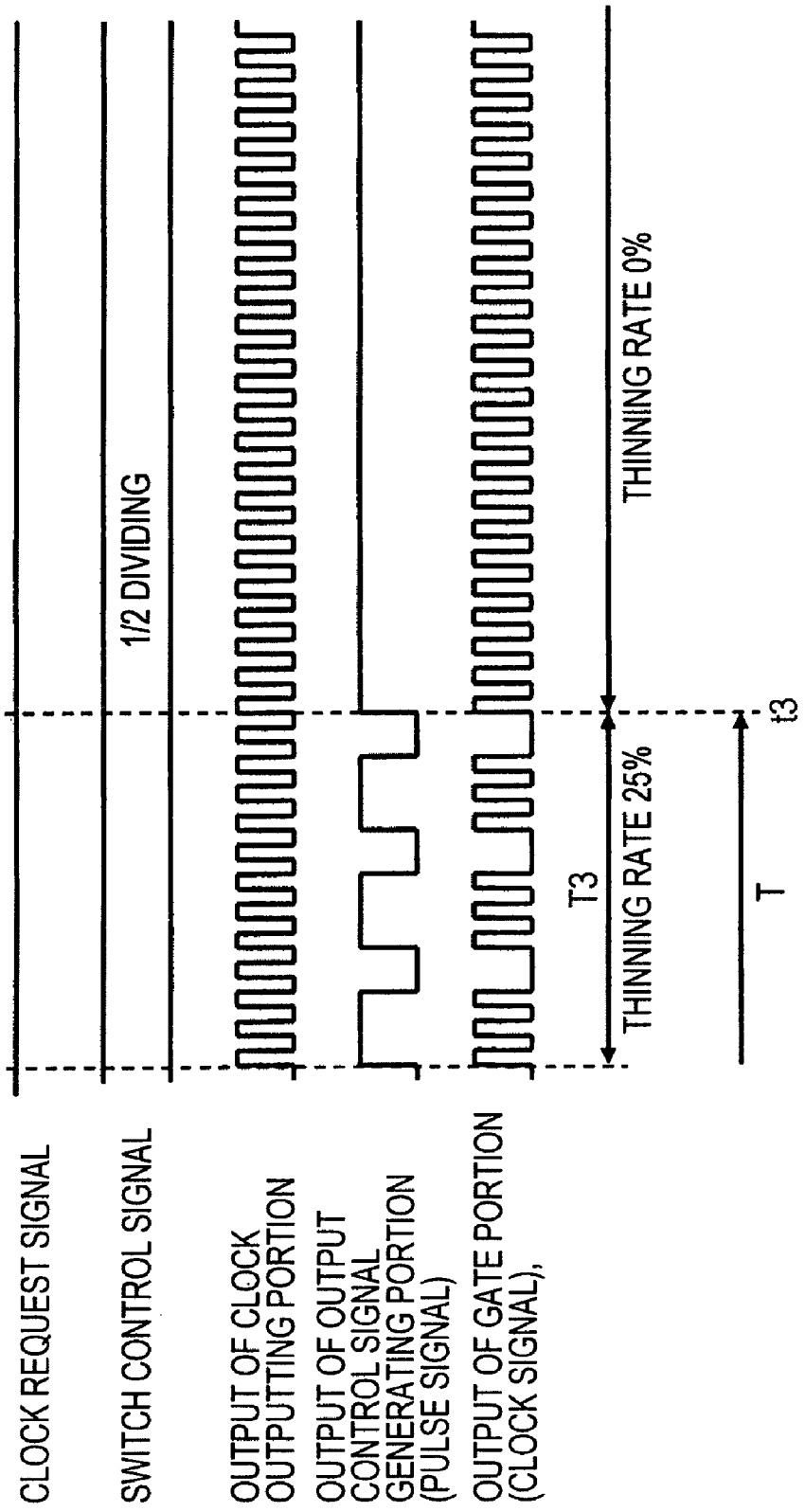

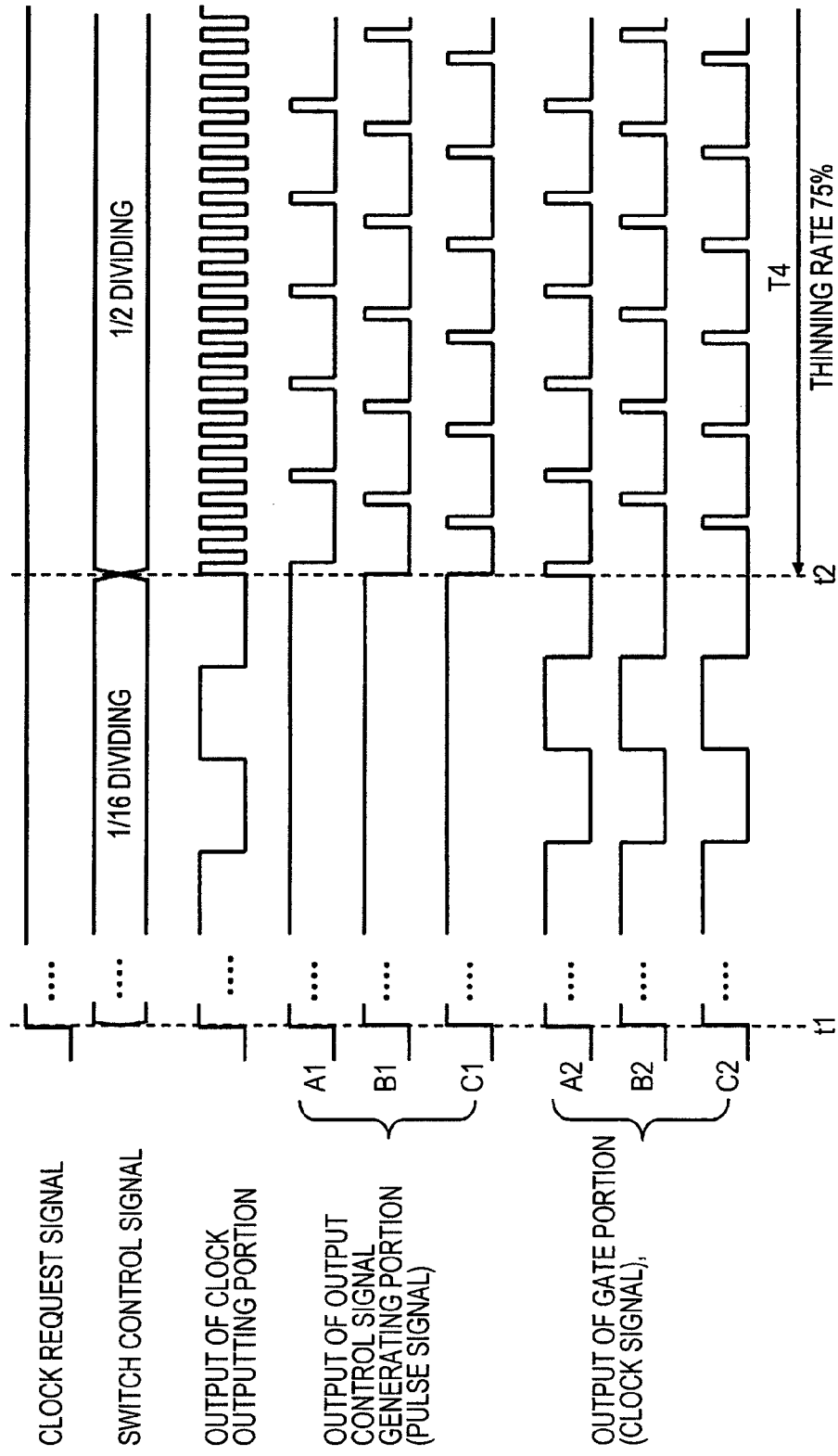

US 8,384,463 B2

CLOCK SUPPLY CIRCUIT AND CONTROL METHOD THEREOF

CROSS-REFERENCE TO RELATED APPLICATIONS

The disclosure of Japanese Patent Application No. 2010-88413 filed on Apr. 7, 2010 including the specification, drawings and abstract is incorporated herein by reference in its entirety.

BACKGROUND

The present invention relates to a clock supply circuit and control method thereof.

In a related art, there is known a configuration of supplying a clock signal only to a module which issues a request for a clock, and stopping to supply the clock signal to a module which does not need supply of a clock for power-saving formation of a system. There is also known a system of pertinently controlling power dissipation by making a frequency of a clock signal high or low in accordance with a load of a system processing or the like as a power management function.

Japanese Patent Application Publication No. 2003-58271 discloses a technology of switching a frequency of a clock in steps as necessary (hereinafter, referred to as clock gear) with an object of a reduction in power dissipation. Generally, the clock gear masks the clock signal based on a synchronizing signal for masking in correspondence with the earliest clock in a processor by using a gated clock buffer.

SUMMARY

However, according to the related art, a rapid change of an electric current is brought about in switching a frequency of a clock signal and an IRDrop, a noise or the like is generated by the influence as shown in FIG. 9.

Also in the case of the technology disclosed in Japanese Patent Application Publication No. 2003-58271, this is only a technology of switching a clock from a certain frequency to a requested frequency with an object of a reduction in power dissipation. Therefore, also in the case of the technology disclosed in Japanese Patent Application Publication No. 2003-58271, the rapid change of an electric current is brought about in switching a frequency of a clock, and an IR drop, a noise or the like is generated by the influence.

According to an aspect of the present invention, a clock supply circuit includes a clock generating portion configured to generate a clock signal and to change a frequency of the clock signal from a first frequency to a second frequency being higher than the first frequency; and a intermittent clock generating portion configured to receive the clock signal and to mask a clock pulse of the clock signal at a predetermined rate for a predetermined period when the frequency of the clock signal is changed to the second frequency.

According to another aspect of the present invention, a control method of a clock supply circuit configured to generate a clock signal, includes: changing a frequency of the clock signal from a first frequency to a second frequency being higher than the first frequency; and masking a clock pulse of the clock signal at predetermined rate for a predetermined period when the frequency of the clock signal is changed to the second frequency.

The circuit configuration and the control method described above can restrain a change in electric current in switching the frequency of the clock signal.

According to the aspects of the present invention, there can be provided a clock supply circuit and control method thereof which can restrain a change in electric current in switching a frequency of a clock signal.

BRIEF DESCRIPTION OF THE DRAWINGS

FIG. 2 is a diagram showing an example of setting a condition register;

FIG. 7B is a timing chart showing the operation of the clock supply circuit according to the first embodiment of the present invention;

FIG. 8 is a timing chart showing an operation of a clock supply circuit according to a second embodiment of the present invention.

DETAILED DESCRIPTION

An explanation will be given of embodiments of the present invention in reference to the drawings as follows. Incidentally, the drawings are simply described, and therefore, a technical range of the present invention may not be interpreted narrowly based on illustration and description of the drawings. The same element is attached with the same notation, and a duplicated explanation thereof will be omitted.

First Embodiment

Figure 1:
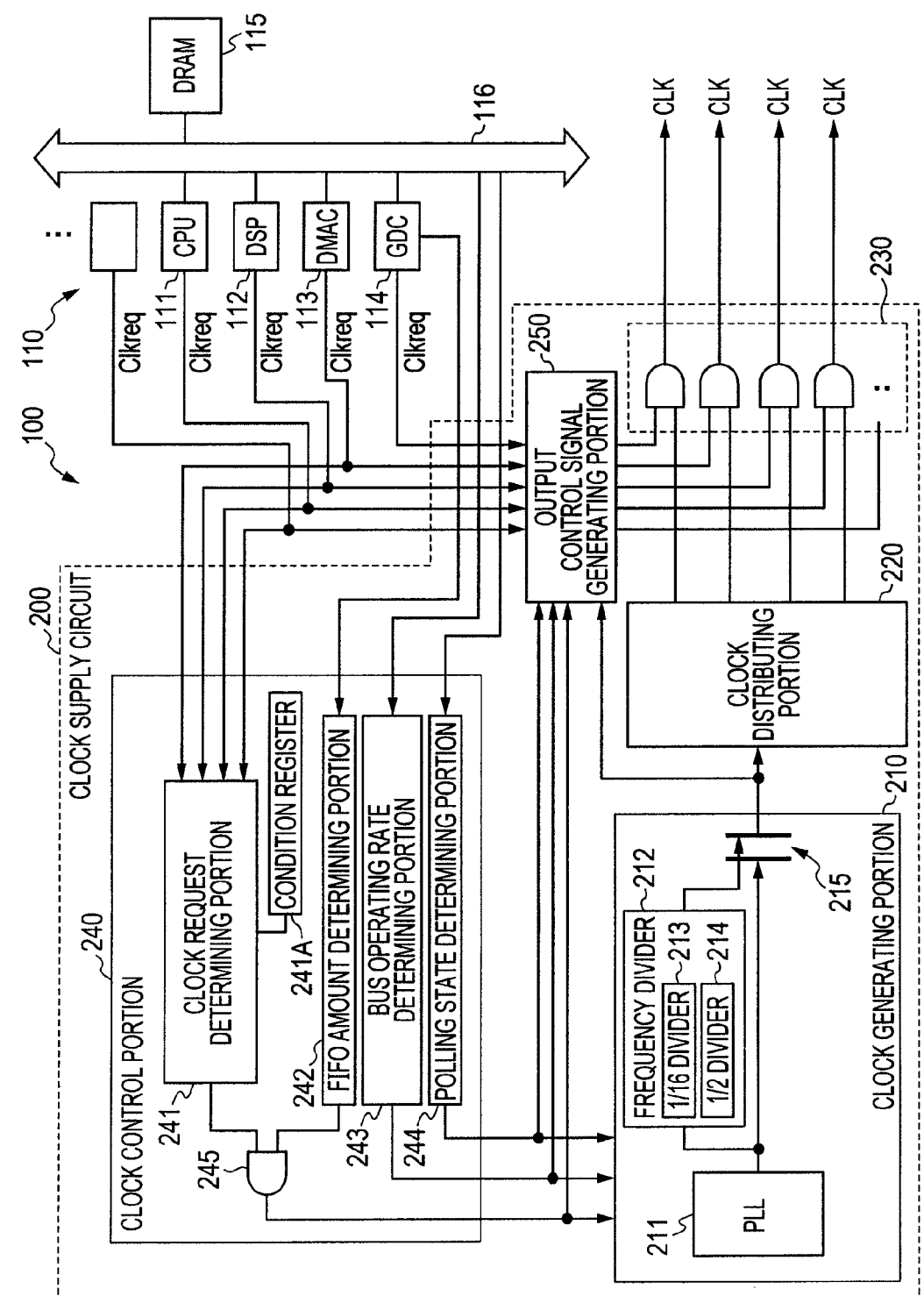
FIG. 1 is a diagram showing a total configuration of a computer system which has a clock supply circuit according to a first embodiment of the present invention.

An explanation will be given of a clock supply circuit according to a first embodiment of the present invention. FIG. 1 is a diagram showing a total configuration of a computer system 100. The computer system 100 includes an operation executing portion 110, and a clock supply circuit (clock supply circuit) 200.

The operation executing portion 110 includes a central processing unit (CPU) 111, a digital signal processor (DSP) 112, a direct memory access controller (DMAC) 113, a graphic display controller (GDC) 114 as well as a dynamic random access memory (DRAM) 115, and a bus 116 connecting these.

Modules (111 through 115) installed in the operation executing portion 110 are operated in synchronism with a clock (clocks). Therefore, the respective modules (111 through 115) make clock request signals Clkreq rise when being operated, and make the clock request signals Clkreq fall when stopping to operate. Further, although in the present specification and the drawings, modules other than the above-described are not particularly referred to, the other module is naturally installed as necessary.

The clock supply circuit 200 is a portion of supplying a clock to the operation executing portion 110. The clock supply circuit 200 includes a clock generating portion 210, a clock distributing portion 220, a gate portion 230, a clock control portion 240, and an output control signal generating portion 250.

A clock supply portion is configured by the clock generating portion 210, the clock distributing portion 220, and the clock control portion 240. Further, an intermittent clock generating portion is configured by the output control signal generating portion 250, and the gate portion 230. The clock supply portion is a portion of switching to output a frequency of a clock signal in accordance with a request from outside. Further, the intermittent clock generating portion is a portion of masking a clock pulse of the clock signal supplied from the clock supply portion by a predetermined thinning rate. Particularly, the intermittent clock generating portion is featured in masking a clock pulse of a clock signal after switching a frequency thereof by a predetermined thinning rate during a predetermined time period (thinning time period) after switching the frequency when the frequency of the clock signal is switched from a certain frequency (first frequency) to a frequency higher than the frequency (second frequency).

The clock generating portion is a portion of switching to output a frequency of a clock signal based on a switch control signal from the clock control portion 240 described later. The clock generating portion 210 includes PLL 211 which generates a high speed clock by multiplying a basic clock supplied from outside, a frequency divider 212 which divides the high speed clock from PLL 211 at a predetermined dividing rate, and a switching portion 215 which switches to output a clock from PLL 211 and a clock from the frequency divider 212. The frequency divider 212 includes a 1/16 divider 213 which divides the high speed clock from PLL 211 by 16 into a clock at the lowest speed, and a 1/2 divider 214 which divides the high speed clock by 2 into a clock at a middle speed. The switching portion 215 switches to output the high speed clock from PLL 211 and a low speed clock from the frequency divider 212. The switching control from the switching portion 215 is carried out by a control signal from the clock control portion 240.

The clock distributing portion 220 is inputted with a clock signal outputted from the clock generating portion 210. The clock distributing portion 220 generates and outputs plural clock signals for distributing to the respective modules (111 through 115) in synchronism with the inputted clock signal.

The gate portion 230 is a portion of masking (thinning) clock pulses of clock signals supplied to the respective modules (111 through 115) based on a pulse signal from a output control signal generating portion 250 described later. The gate portion 230 is configured by, for example, plural AND circuits (gate circuits). The plural AND circuits are provided in correspondence with the respective modules (111 through 115). One input terminal of each AND circuit is inputted with the corresponding pulse signal generated by the output control signal generating portion 250 (details thereof will be described later). The other input terminal of each AND circuit is inputted with the clock signal outputted from the clock distributing portion 220. Although described later, the pulse signal generated by the output control signal generating portion 250 is changed also based on the clock request signals Clkreq outputted from the respective modules (111 through 115). Therefore, the clock signal is supplied only to the modules (111 through 115) of raising the clock request signal to H level.

Next, an explanation will be given of a clock control portion 240. The clock control portion 240 is a portion of generating the switch control signal for controlling the clock signal based on a request for a clock (for example, clock request signal Clkreq), and outputting the switch control signal to the clock generating portion 210 and the output control signal generating portion 250. The clock control portion 240 has a clock request determining portion 241, an FIFO amount determining portion 242, a bus operating rate determining portion 243, and a polling state determining portion 244.

The clock request determining portion 241 is inputted with the clock request signals Clkreq from the respective modules (111 through 115). The clock request determining portion 241 monitors presence/absence of requests for clocks from the respective modules (111 through 115), and compares patterns of presence/absence of the requests for the clocks with a preset condition pattern.

Here, the clock request determining portion 241 is attached with a condition register 241A. The condition register 241A is previously registered with identification codes of plural modules (111 through 115), and is made to be able to select and set a module which is made to be a monitoring object.

FIG. 2 is a diagram showing an example of setting the condition register 241A. The condition register 241A is registered with names of modules, and can set monitor flags arbitrarily by "0" and "1". For example, in the example shown in FIG. 2, the monitor flag is set to "0" as an initial value, and when the monitor flag is "0", the module is made to be the monitoring object, and by setting the monitoring flag to "1", the module can be selected to set to outside of the monitoring object. In a case where the clock request signals from all of the modules which are made to be the monitoring objects (monitor flags are made to be "0") are brought into an L level, the clock request determining portion 241 determines that conditions are satisfied, and outputs a control signal of reducing a clock frequency to a 1/16 frequency.

The FIFO amount determining portion 242 monitors a remaining amount of an FIFO buffer of modules of an FIFO type which processes data in turn from the start. The FIFO amount determining portion 242 is set with a threshold, determines that the FIFO buffer remaining amount value remains in a safety zone when the remaining amount value of the FIFO buffer exceeds the threshold, and outputs the control signal of reducing the clock frequency to the 1/16 frequency. Further, as the module of the FIFO type, the graphic display controller (GDC) 114 is pointed out as an example. The clock request signal Clkreq from the graphic display controller (GDC) 114 is not inputted to the clock request determining portion 241, and instead thereof, the FIFO buffer remaining amount value is monitored by the FIFO amount determining portion 242.

A determination by the clock request determining portion 241 and a determination by the FIFO amount determining portion 242 are further determined by an AND condition by an AND circuit 245. When both of the conditions are satisfied, a switch control signal of outputting a divided-by-16 clock of the lowest speed is provided to the clock generating portion 210. The clock generating portion 210 generates the divided-by-16 clock by the frequency divider 212 when the clock generating portion 210 receives the switch control signal. The switching portion 215 carries out a switching operation so as to output the divided-by-16 clock from the frequency divider 212.

The bus operating rate determining portion 243 monitors an operating rate of the bus 116, and controls up, maintain, down of the clock frequency based on the operating rate of the bus 116 per unit time. The bus operating rate determining portion 243 is inputted with a signal for detecting activeness of an address bus and a data bus of the bus 116. The bus operating rate determining portion 243 estimates the bus operating rate by active period of DRAM 115 per unit time.

Figure 3:
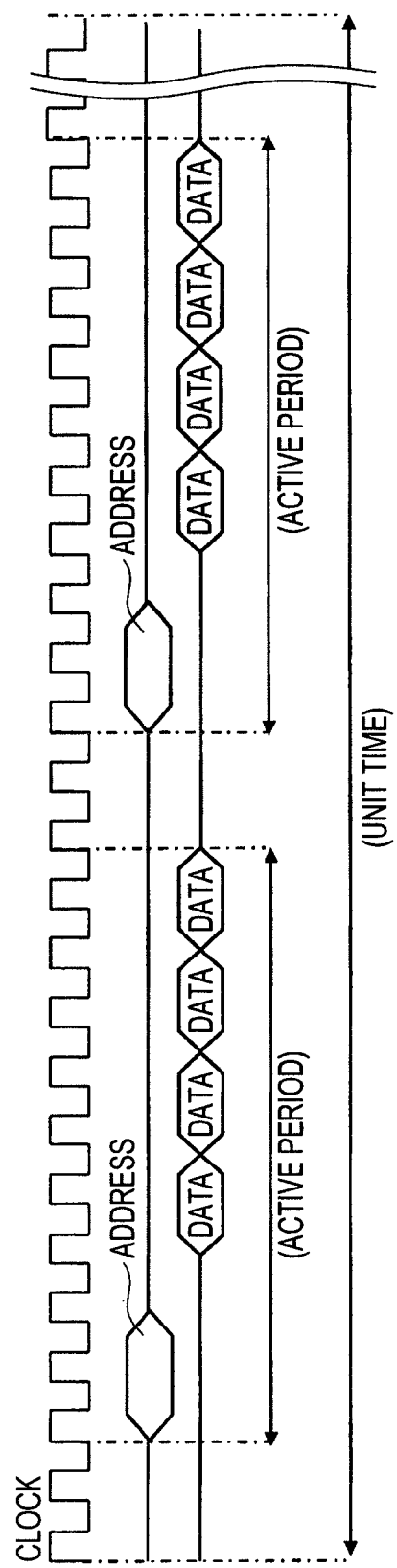
FIG. 3 is a timing chart showing an operation timing of DRAM.

FIG. 3 is a timing chart showing an operational timing of DRAM 115. As shown in FIG. 3, data are outputted in synchronism with a clock in accordance with an input of a read start address. The active period of DRAM 115 is defined as a time period from inputting an address which is a start of a protocol until a final one of the data which is an end of the protocol. A rate by which the active period occupies within unit time is defined as a bus operating rate.

Figure 4:
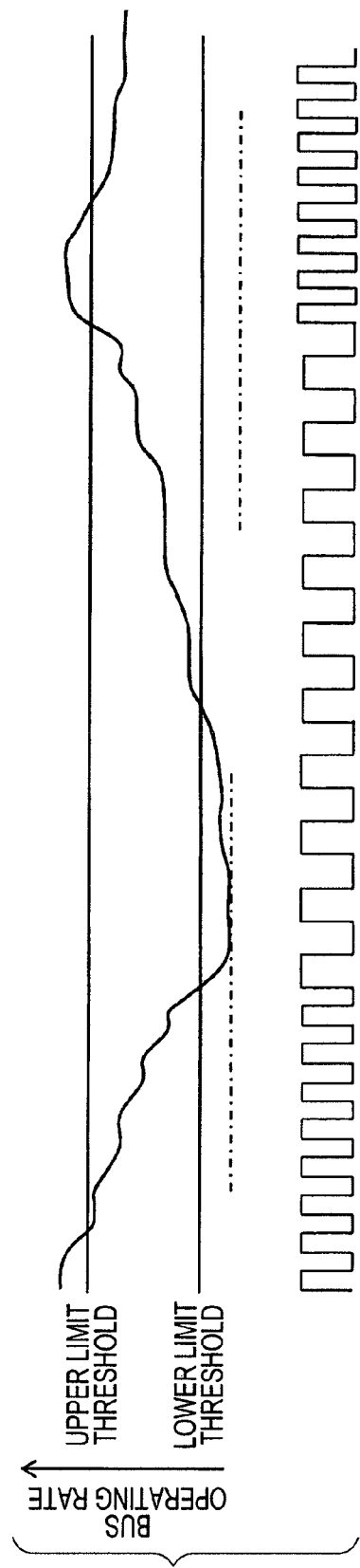
FIG. 4 is a timing chart showing a relationship between a bus operating rate and a clock frequency.

The bus operating rate determining portion 243 is set with an upper limit threshold and a lower limit threshold, and determines an increase or a decrease in the clock frequency by comparing the bus operating rate with the upper limit threshold and the lower limit threshold. FIG. 4 is a timing chart showing a relationship between the bus operating rate and the clock frequency. When the active rate becomes lower than the lower limit threshold, the switch control signal of dividing the clock frequency by 2 is outputted to the clock generating portion 210. When the active rate is higher than the upper limit threshold, the switch control signal of dividing the clock frequency by 1, that is, bringing the clock frequency to the highest speed is issued.

The polling state determining portion 244 detects a module brought into the polling state by monitoring the address bus of the bus 116, and controls to increase or decrease the clock frequency by comparing with a preset condition. The polling state determining portion 244 monitors an address signal from the address bus, and determines that the module is brought into polling when the same address is consecutively outputted predetermined times (for example, three times).

Here, an explanation will be given of an example of a case where the monitoring objects of polling are made to be CPU 111 and DSP 112. When both of CPU 111 and DSP 112 are determined to be brought into polling, the polling state determining portion 244 provides a control signal of reducing the clock frequency to the ½ frequency to the clock generating portion 210. When either of CPU 111 and DSP 112 is brought into polling, the polling state determining portion 244 sees if the other is brought into a standby state, and when the other is brought into the standby state, the polling state determining portion 244 provides the control signal of reducing the clock frequency to the ½ frequency to the clock generating portion 210. Even if either of CPU 111 and DSP 112 is brought into polling, when the other is operated without being brought into the standby state, the polling state determining portion 244 returns the clock frequency to a high speed frequency.

Figure 5:
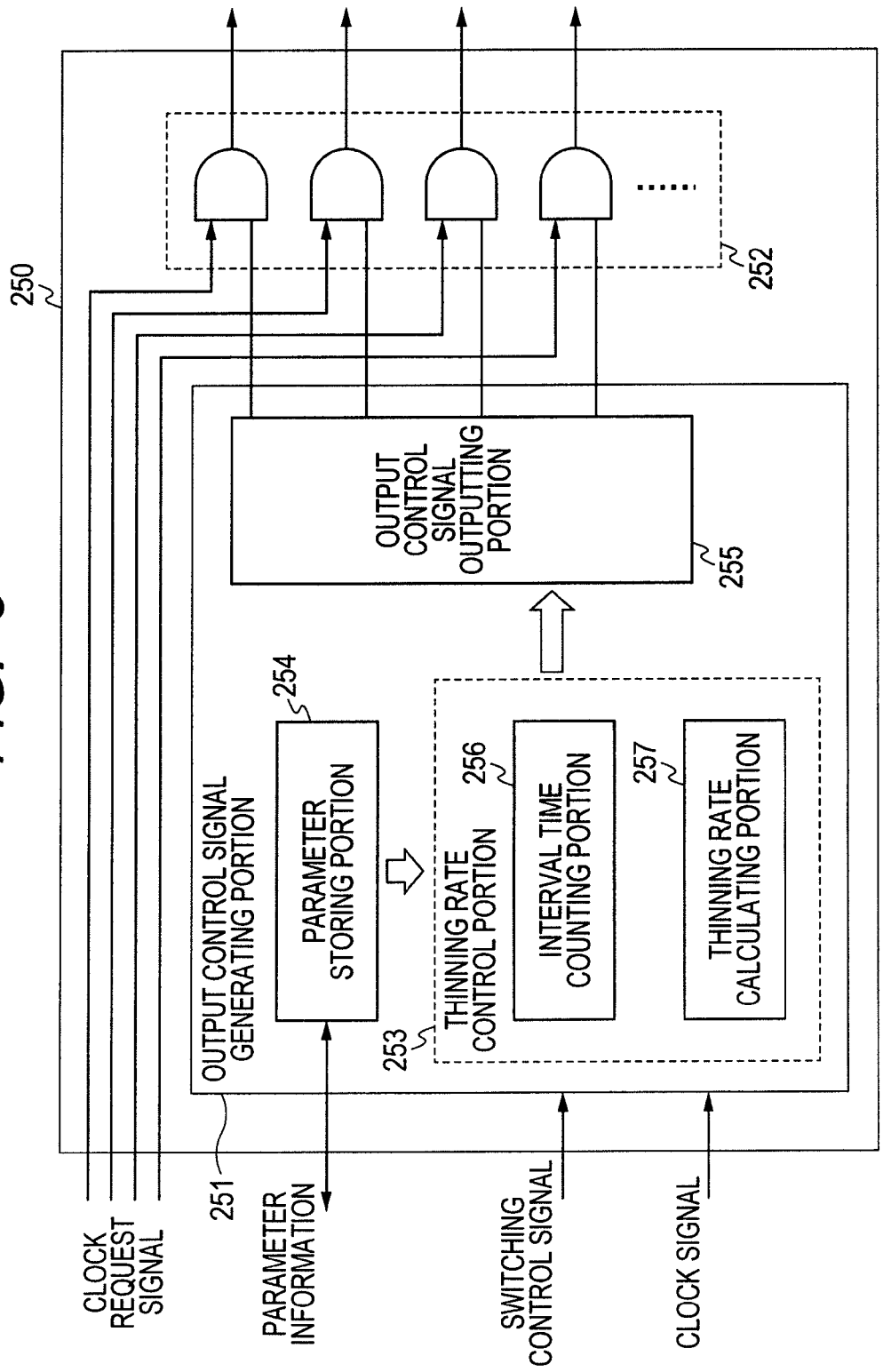
FIG. 5 is a block diagram showing an output control signal generating portion according to the first embodiment of the present invention.

Next, an explanation will be given of the output control signal generating portion 250. FIG. 5 is a block diagram of the output control signal generating portion 250. The output control signal generating portion 250 is a portion of generating a pulse signal for masking (thinning) clock pulses of clock signals supplied to the respective modules (111 through 115) based on the clock request signals Clkreq and the switch control signal. The output control signal generating portion 250 is featured in that when a frequency of the clock signal is switched from a certain frequency (first frequency) to a frequency higher than the frequency (second frequency), the signal generating portion 250 generates a pulse signal in accordance with a predetermined thinning rate during a predetermined time period (thinning time period) after switching the frequency. Thereby, the gate portion 230 at a later stage can mask a clock pulse of a clock signal after switching the frequency by a predetermined thinning rate based on the pulse signal. The thinning rate is a rate of masking a clock pulse which forms the clock signal.

The output control signal generating portion 250 includes an output control signal generating portion 251, and a gate portion 252. The output control signal generating portion 251 includes a thinning rate control portion 253 having an interval time counting portion 256 and a thinning rate calculating portion 257, a parameter storing portion (storing portion) 254, and a output control signal outputting portion 255.

The output control signal generating portion 251 is a portion of generating a thinning control signal for masking clock pulses of clock signals supplied to the respective modules (111 through 115) based on the switch control signal outputted from the clock control portion 240.

The output control signal generating portion 251 is inputted with parameter information provided from outside, the switch control signal outputted from the clock control portion 240, and a clock signal outputted from the clock generating portion 210. The output control signal generating portion 251 generates plural thinning control signals in correspondence with the respective modules (111 through 115). Hereinafter, a further specific explanation will be given of the output control signal generating portion 251.

The parameter storing portion 254 is configured by a register circuit, and stores the parameter information provided from outside. Thinning time periods and thinning rates or the like of clock signals in accordance with clock frequencies before and after switching and the like are specified by the parameter information. The parameter information is provided to the thinning rate control portion 253.

The thinning rate control portion 253 is a portion of controlling the thinning time period and the thinning rate or the like of the clock signal after switching the frequency based on the switch control signal outputted from the clock control portion 240. The switching control signal includes information of clock frequencies before and after switching. As described above, the thinning time periods and the thinning rates or the like of the clock signals in accordance with the clock frequencies before and after switching are preset by the parameter information.

In the thinning rate control portion 253, the interval time counting portion 256 carries out a counting operation in synchronism with the clock signal, and counts the thinning time period based on the switch control signal. The thinning rate calculating portion 257 generates information of the thinning rate based on the switch control signal by carrying out a predetermining calculating operation. When the thinning rate of the clock signal is changed in steps during the thinning time period, the thinning rate control portion 253 generates information of a number of steps thereof, thinning time periods at respective steps, and thinning rates at respective steps. Pieces of information including a count value of the interval time counting portion 256 (information of thinning time period), and information of the thinning rate outputted from the thinning rate calculating portion 257 are provided to the output control signal outputting portion 255.

The output control signal outputting portion 255 generates plural thinning control signals in correspondence with the respective modules (111 through 115) based on information provided from the thinning rate control portion 253. The thinning control signal is used for masking the clock pulse of the clock signal. Therefore, the thinning control signal needs to have a frequency in accordance with the clock signal. A waveform of the thinning control signal is therefore formed based on the clock signal. The output control signal outputting portion 255 outputs a thinning control signal at H level other than during the thinning time period, that is, in a case where the frequency of the clock signal is constant. On the other hand, the output control signal outputting portion 255 outputs the thinning control signal of the frequency in accordance with the information from the thinning rate control portion 253 during the thinning time period, that is, a predetermined time period after switching the frequency of the clock signal.

Next, the gate portion 252 is a portion of determining the clock request signals Clkreq outputted from the respective modules (111 through 115) and corresponding thinning control signals by an AND condition, and outputting the signals respectively as pulse signals.

The gate portion 252 is configured by, for example, plural AND circuits. The plural AND circuits are provided in correspondence with the respective modules (111 through 115). One input terminal of each AND circuit is inputted with a clock request signal Clkreq outputted from each module (111 through 115). The other input terminal of each AND circuit is inputted with a corresponding thinning control signal generated by the output control signal generating portion 251. The respective AND circuits determine the clock request signals Clkreq outputted from the respective modules (111 through 115) and the corresponding thinning control signals by the AND condition, and respectively output the result. The gate portion 252 outputs the corresponding thinning control signal as the pulse signal during the thinning time period set from time of switching the frequency, in a case where the clock request signals Clkreq are at H level, when the frequency of the clock signal is switched. The pulse signals are inputted to the gate portion 230. Thereby, the gate portion 230 can mask the clock pulse of the clock signal by the set thinning rate during the set thinning time period.

Figure 6:
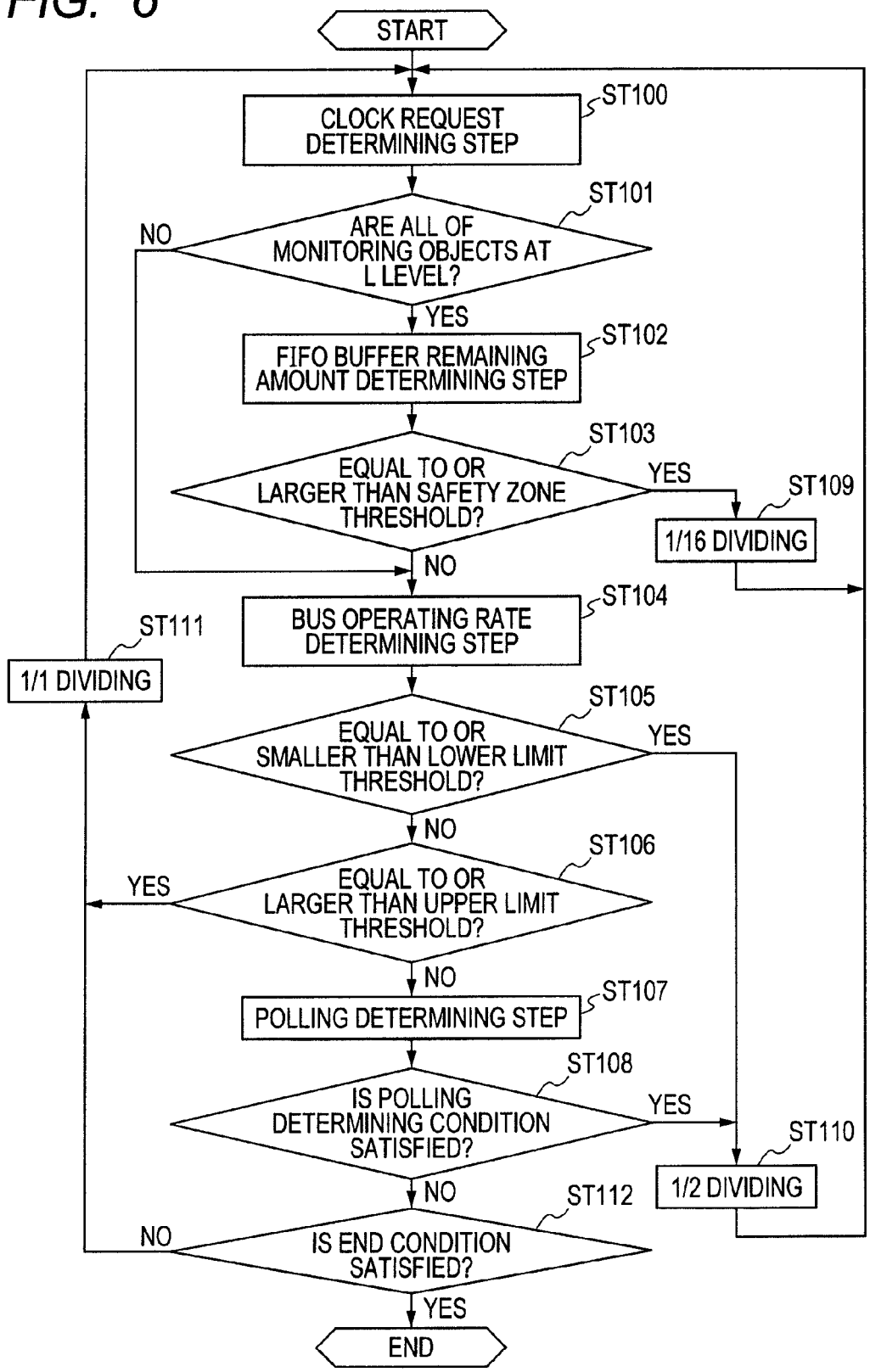
FIG. 6 is a flowchart showing an operation of a clock supply circuit according to the first embodiment of the present invention.

An explanation will be given of an operation of the clock supply circuit having such a configuration. FIG. 6 is a flowchart showing an operational procedure of the clock frequency control method by the clock supply circuit 200. First, initially, assume that a clock of the highest speed frequency (that is, ⅟₁ dividing from PLL) is outputted from the clock generating portion 210.

A clock request determining step is carried out at ST100. At the step, in the clock request determining portion 241, presence or absence of clock requests from the respective modules (111 through 115) is compared with the condition set at the condition register 241A, and it is determined whether all of the clock request signals from modules which are determined as the monitoring objects become at L level. In a case where all of the clock request signals from the modules which are determined as monitoring objects are at L level (ST101: YES), next, an FIFO buffer remaining amount determining step (ST102) is carried out by the FIFO amount determining portion 242.

At the FIFO buffer remaining amount determining step (ST102), the FIFO buffer remaining amount of the module of the FIFO type which is made to be the monitoring object (for example, GDC) is compared with the threshold of the safety zone. When the FIFO buffer remaining amount is equal to or larger than the threshold of the safety zone (ST103: YES), all of the clock request signals of the modules which are made to be the monitoring objects are at L level, further, the FIFO buffer remaining amount is in the safety zone. Therefore, the clock generating portion 210 has a control signal which divides the clock frequency by 16 to make the clock at the lowest speed (ST109).

After dividing the clock frequency by 16 to make the clock at the lowest speed at ST109, the loop is repeated by returning to ST100. When conditions are satisfied at the clock request determining step (ST100) and the FIFO buffer remaining amount determining step (ST102) (ST101 and ST103: YES), the divided-by-16 clock of the lowest speed is continued to supply.

Here, when the predetermined condition is not satisfied at the clock request determining step (ST100) or the FIFO buffer remaining amount determining step (ST102) (ST101 or ST103: NO), it is necessary to increase the clock frequency. Hence, the operation of the clock frequency control method proceeds to execute the bus operating rate determining step (ST104) by the bus operating rate determining portion 243.

At the bus operating rate determining step (ST104), the bus operating rate is measured from the active period of DRAM 115 per unit time and the bus operating rate is compared with thresholds (lower limit threshold, upper limit threshold). When the bus operating rate is equal to or smaller than the lower limit threshold, a control signal of dividing the clock frequency by 2 is provided to the clock generating portion 210 (ST110). The step divides the clock frequency by 2 as about middle frequency speed because although the predetermined condition is not satisfied at the clock request determining step (ST100) or the FIFO buffer remaining amount determining step (ST102) (ST101 and ST103: NO), the load of the system 100 can be determined to be about middle in view of a data amount flowing in the bus 110. Thereby, wasteful power is reduced while sufficiently continuing a processing of a necessary task without carrying out wasteful high speed operation.

On the other hand, when the bus operating rate is equal to or larger than the upper limit threshold, a control signal of dividing the clock frequency by 1 is provided to the clock output (ST111). That is, the clock frequency is made to be the highest speed. For example, when the clock frequency is divided by 16 to make the clock at the lowest speed, or by 2 to make the clock at the middle speed, a flow of processing tasks of respective modules becomes stagnant, and a number of the modules get access to DRAM 115 incessantly; therefore, the bus operating rate is increased. Hence, when the bus operating rate is equal to or larger than the upper limit threshold, the clock frequency is made to be the highest speed. In this way, when the load of the system 100 is large, by making the clock frequency at high speed, a necessary processing can be executed by the operation executing portion 110 rapidly at a necessary timing.

Here, in the bus operating rate determining step (ST104), when the bus operating rate is between the upper limit threshold and the lower limit threshold (ST105, ST106: NO), successively, the polling determining step (ST107) is carried out in a state of maintaining the clock frequency as it is. At the polling determining step (ST107), in view of an address signal from an address bus, it is determined whether there is a module which is made to be the monitoring object which consecutively outputs the same address predetermined times (for example, three times) (for example, CPU, DSP). When there is the module which is made to be the monitoring object and which is brought into polling, it is viewed whether the module of the other monitoring object is brought into a polling state or a standby state. When the module of the other monitoring object is brought into the polling or the standby state (ST108: YES), a control signal of dividing the clock frequency by 2 is provided to the clock generating portion 210 (ST110). The presence of the module which has entered the polling state indicates that the load of the system 100 can be determined not to be so large; therefore, the clock frequency is divided by 2 to be a clock of about middle frequency speed. Thereby, wasteful power is reduced while sufficiently continuing the processing of the necessary task without carrying out wasteful high speed operation.

On the other hand, in a case where there is not a module which is brought into polling, or other module of a monitoring object is executing a processing (ST108: NO), the clock frequency is returned to 1/1 dividing of the highest speed.

Further, the operation returns to ST100 until satisfying an end condition (ST112) and the operation is repeated in a loop-like state. As the end condition, a case where a system stopping instruction is inputted or the like is pointed out as an example.

In this way, the clock supply circuit 200 according to the embodiment can reduce power dissipation by switching the frequency of the clock signal in accordance with requests from the respective modules (111 through 115).

Figure 7A:
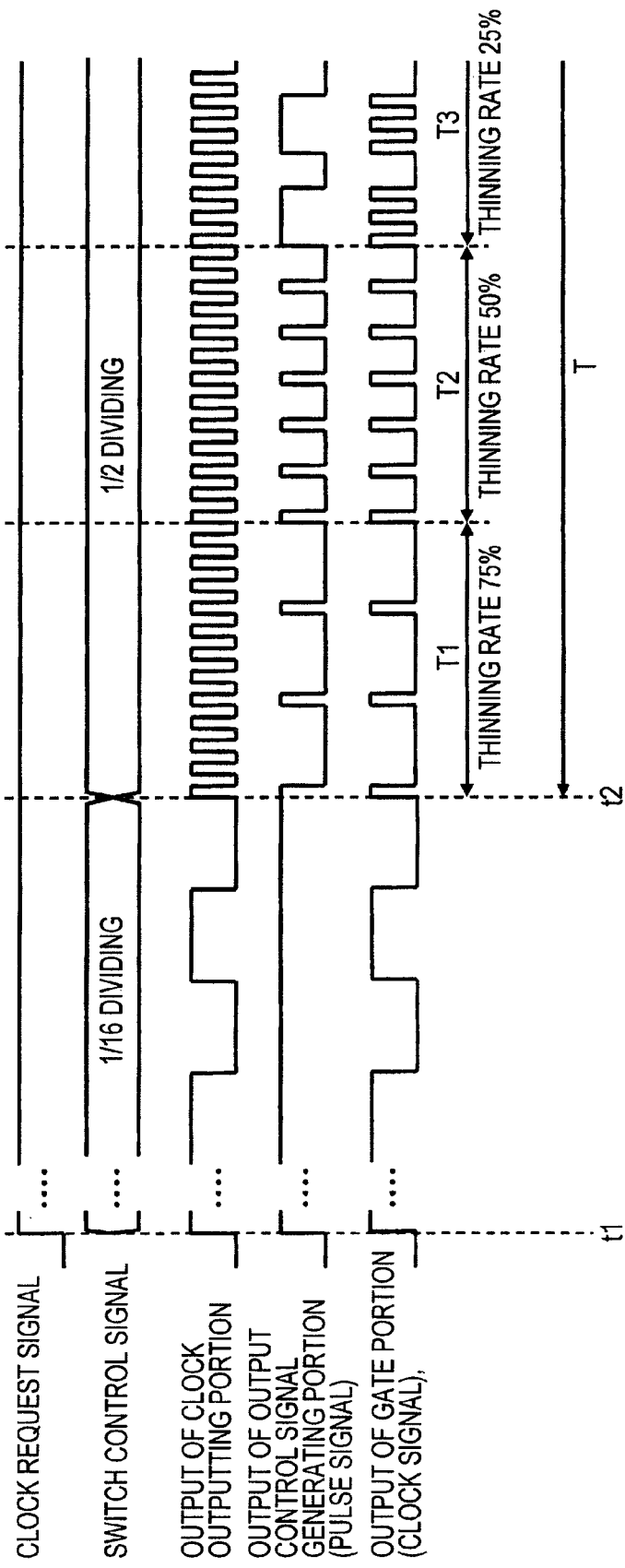
FIG. 7A is a timing chart showing an operation of a clock supply circuit according to the first embodiment of the present invention.
Figure 9:
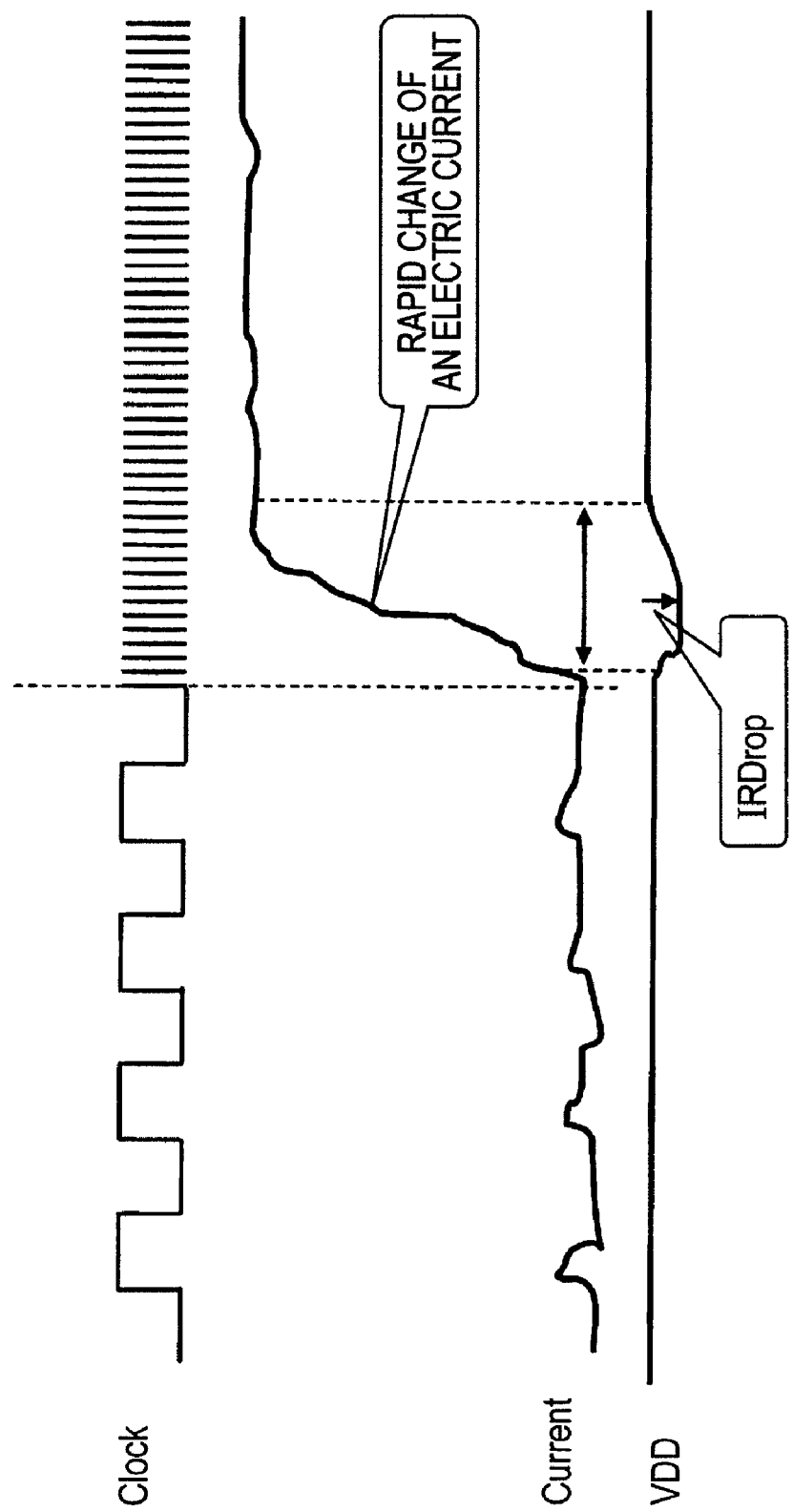
FIG. 9 is a timing chart showing changes in electric current and voltage in switching a frequency of the clock signal.

Next, an explanation will be given of an operation of thinning a clock signal by the clock control portion 240. FIG. 7A and FIG. 7B are timing charts for explaining an operation of thinning a clock signal by the clock control portion 240. FIG. 7A and FIG. 7B only show the clock request signals (Clkreq) from the respective modules (111 through 115), the switch control signal from the clock control portion 240, a clock signal from the clock generating portion 210, a pulse signal from the output control signal generating portion 250, and a clock signal from the gate portion 230. In FIG. 7A and FIG. 7B, an explanation will be given of an example of a case where the clock signal is switched from the 1/16 dividing to the 1/2 dividing. In FIG. 7A and FIG. 7B, an explanation will be given of an example of a case where timings of signal changes of the plural clock request signals are the same, and timings of signal changes of the plural clock signals outputted from the gate portion 230 are the same. Therefore, FIG. 7A and FIG. 7B show only one clock request signal, one corresponding pulse signal, and one corresponding clock signal.

First, at time t1, the clock request signal is made to rise to H level. Thereafter, the clock control portion 240 outputs the switching control signal for 1/16 dividing in accordance with a procedure of the flowchart shown in FIG. 6. Thereby, the clock generating portion 210 outputs the clock signal of the 1/16 dividing. At this occasion, the output control signal generating portion 250 outputs a signal at H level. Therefore, the gate portion 230 outputs the clock signal of the 1/16 dividing as it is via the AND circuit.

At time t2, the clock control portion 240 switches the switch control signal from that for the 1/16 dividing to that for the 1/2 dividing. Thereby, the clock generating portion 210 outputs the clock signal of the 1/2 dividing. At this time, the output control signal generating portion 250 generates a pulse signal of a frequency in accordance with clock frequencies before and after switching during a thinning time period (time period T) in accordance with the clock frequencies before and after switching. In the examples of FIG. 7A and FIG. 7B, the output control signal generating portion 250 divides the thinning time period T in three stages, and generates pulse signals having inherent frequencies, inherent duty ratios and inherent phases for respective stages during the thinning time period T (time periods T1 through T3). Thereby, the gate portion 230 masks the clock pulse of the clock signal of the 1/2 dividing outputted from the clock distributing portion 220 by using the pulse signals from the output control signal generating portion 250. In the example of FIG. 7A and FIG. 7B, the gate portion 230 masks the clock pulse of the clock signal by the thinning rate of 75% during the thinning time period T1. Similarly, the gate portion 230 masks the clock pulse of the clock signal by a thinning rate of 50% during the thinning time period T2. The gate portion masks the clock pulse of the clock signal by a thinning rate of 25% during the thinning time period T3.

Further, the thinning time period T is terminated at time t3 (FIG. 7B). Thereby, the output control signal generating portion 250 outputs a signal at H level again. Therefore, the gate portion 230 outputs the clock signal of the 1/2 dividing outputted from the clock distributing portion 220 as it is via the AND circuit.

In this way, the clock supply circuit according to the embodiment can mask the clock pulse of the clock signal after switching the frequency by a predetermined thinning rate during a predetermined time period after switching the frequency in switching the frequency of the clock signal. Thereby, the clock supply circuit according to the embodiment can restrain a rapid change of an electric current in switching the frequency of the clock signal.

Although in FIG. 7A and FIG. 7B, the explanation has been given of the example of the case where the frequency of the pulse signal or the like is switched in three stages (time periods T1 through T3) during the thinning time period T, the invention is not limited thereto. During the thinning time period T, the frequency of the pulse signal or the like may be switched in arbitrary stages. Although in FIG. 7A and FIG. 7B, the explanation has been given of the example of the case where the thinning time periods T1 through T3 are time periods the same as each other, the invention is not limited thereto. The thinning time periods T1 through T3 may be time periods which are different from each other. Although in FIG. 7A and FIG. 7B, the explanation has been given of the example of the case where the thinning rates of the respective thinning time periods T1 through T3 are changed (reduced) by constant rates, the invention is not limited thereto. For example, the thinning rates can arbitrarily be set such that the thinning rate during the thinning time period T1 is 90%, the thinning rate during the thinning time period T2 is 50%, and the thinning rate during the thinning time period T3 is 40%. Also time periods of the thinning time period T can arbitrarily be set. Incidentally, these can be set based on the parameter information provided from outside.

Second Embodiment

An explanation will be given of a clock supply circuit according to a second embodiment of the present invention. The clock supply circuit 200 according to the embodiment is featured in that when plural clock signals supplied to the modules (111 through 115) are masked, the clock pulses of the respective clock signals are masked by timings which are different from each other. The other circuit configuration and operation are similar to those in the first embodiment.

An explanation will be given of an operation of thinning a clock signal by the clock control portion 240. FIG. 8 is a timing chart for explaining an operation of thinning a clock signal by the clock control portion 240. In FIG. 8, only clock request signals (Clkreq) from the respective modules (111 through 115), a switch control signal from the clock control portion 240, a clock signal from the clock generating portion 210, a pulse signal from the output control signal generating portion 250, and a clock signal from the gate portion 230 are shown. In FIG. 8, an explanation will be given of an example of a case where the clock signal is switched from 1/16 dividing to 1/2 dividing. In FIG. 8, an explanation will be given of an example of a case where timings of signal changes of plural clock request signals are the same. Therefore, in FIG. 8, only one clock request signal is shown. FIG. 8 shows three pulse signals: A1 through C1 as pulse signals outputted from the output control signal generating portion 250, and three corresponding clock signals: A2 through C2 as clock signals outputted from the gate portion 230.

First, at time t1, a clock request signal is raised to H level. Thereafter, the clock control portion 240 outputs a switch control signal for 1/16 dividing in accordance with a procedure of the flowchart shown in FIG. 6. Thereby, the clock generating portion 210 outputs a clock signal of 1/16 dividing. At this occasion, the output control signal generating portion 250 outputs a signal at H level. Therefore, the gate portion 230 outputs the clock signal of 1/16 dividing as it is via the AND circuit.

At time t2, the clock control portion 240 switches the switch control signal from that for 1/16 dividing to that for the 1/2 dividing. Thereby, the clock generating portion 210 outputs the clock signal of 1/2 dividing. At this time, the output control signal generating portion 250 generates a pulse signal of a frequency in accordance with clock frequencies before and after switching during a thinning time period (time period T4). Thereby, the gate portion 230 masks a clock pulse of a clock signal of 1/2 dividing outputted from the clock distributing portion 220 by using the pulse signal from the output control signal generating portion 250. In the example of FIG. 8, the gate portion 230 masks the clock pulse of the clock signal by a thinning rate of 75% during the thinning time period T4.

At this time, the output control signal generating portion 250 generates pulse signals A1 through C1 at timings different from each other although the thinning rates stay the same. Thereby, the gate portion 230 masks the clock signals of 1/2 dividing outputted from the clock distributing portion 220 by timings different from each other, and outputs the clock signals respectively as clock signals A2 through C2. Thereafter, the clock supply circuit 200 masks the clock pulse of the clock signal, for example, in steps, and outputs the clock signals of 1/2 dividing outputted from the clock distributing portion 220 as they are after an elapse of the thinning time period.

In this way, the clock supply circuit according to the embodiment can mask the clock pulse of the clock signal after switching the frequency by the predetermined thinning rate during the predetermined time period after switching the frequency in switching the frequency of the clock signal. Thereby, the clock supply circuit according to the embodiment can restrain a rapid change of an electric current in switching the frequency of the clock signal. Further, the clock supply circuit according to the embodiment masks the clock pulses of the clock signals by timings different from each other when the clock pulses of the plural clock signals supplied to the modules (111 through 115) are masked. Thereby, the electric current change can further be restrained more than for masking the clock pulses of the respective clock signals by the same timing.

The present invention is not limited to the above-described embodiments but can pertinently be changed within the range not deviated from a gist thereof. Although in the above-described embodiments, there has been exemplified the case where the clock generating portion 210 outputs the clock signal of the highest speed outputted from the PLL, the clock signal of 1/16 dividing of the lowest speed, and the clock signal of 1/2 dividing of middle speed, the dividing rate of the frequency divider may further be divided finely in plural stages.

Although in the above-described embodiment, the explanation has been given of the example of the case where the gate portion 230 includes the plural AND circuits, the invention is not limited thereto. The gate portion 230 can pertinently be changed also to a circuit configuration which includes a general clock gating circuit formed by combining with an AND circuit and a latch circuit.

What is claimed is:

1. A clock supply circuit, comprising:
   a clock generating portion configured to generate a clock signal and to change a frequency of the clock signal from a first frequency to a second frequency being higher than the first frequency; and
   a intermittent clock generating portion configured to receive the clock signal and to mask a clock pulse of the clock signal at a predetermined rate for a predetermined period when the frequency of the clock signal is changed to the second frequency,
   wherein the clock generating portion changes the frequency in response to a control signal,
   wherein the predetermined rate comprises a plurality of mask rates, and
   wherein the intermittent clock generating portion masks the clock pulse of the clock signal in stages based on the plurality of mask rates.

2. The clock supply circuit according to claim 1,
   wherein the intermittent clock generating portion has a parameter storing portion storing the predetermined rate and/or the predetermined period.

3. A processor system, comprising:
   a clock supply circuit configured to generate a clock signal,
   wherein the clock supply circuit changes a frequency of the clock signal from a first frequency to a second frequency being higher than the first frequency in response to a clock request signal issued by another circuit,
   wherein the clock supply circuit masks a clock pulse of the clock signal at a predetermined rate for a predetermined period when the frequency of the clock signal is changed to the second frequency,
   wherein the clock supply circuit changes the frequency in response to a control signal,
   wherein the predetermined rate comprises a plurality of mask rates, and
   wherein the clock supply circuit masks the clock pulse of the clock signal in stages based on the plurality of mask rates.

4. A control method of a clock supply circuit configured to generate a clock signal, the control method comprising:
   changing a frequency of the clock signal from a first frequency to a second frequency being higher than the first frequency; and
   masking a clock pulse of the clock signal at predetermined rate for a predetermined period when the frequency of the clock signal is changed to the second frequency
   wherein the changing the frequency of the clock signal comprises changing the frequency in response to a control signal,
   wherein the predetermined rate comprises a plurality of mask rates, and
   wherein the masking the clock pulse of the clock signal comprises masking the clock pulse of the clock signal in stages based on the plurality of mask rates.

* * * * *